June 9, 1959 — R. G. COLEMAN — 2,889,721
TOOL HOLDER ATTACHMENT FOR PIPE PROCESSING MACHINES
Filed June 27, 1957 — 2 Sheets-Sheet 1
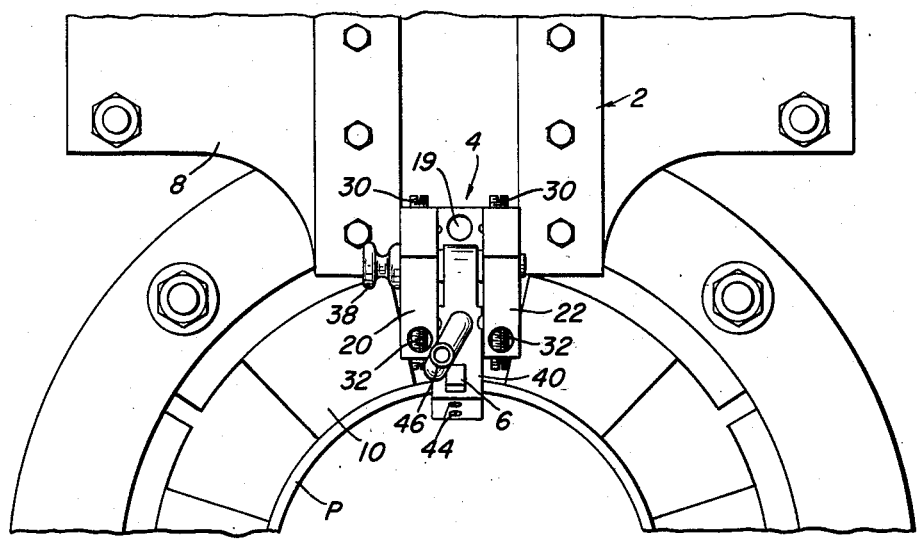
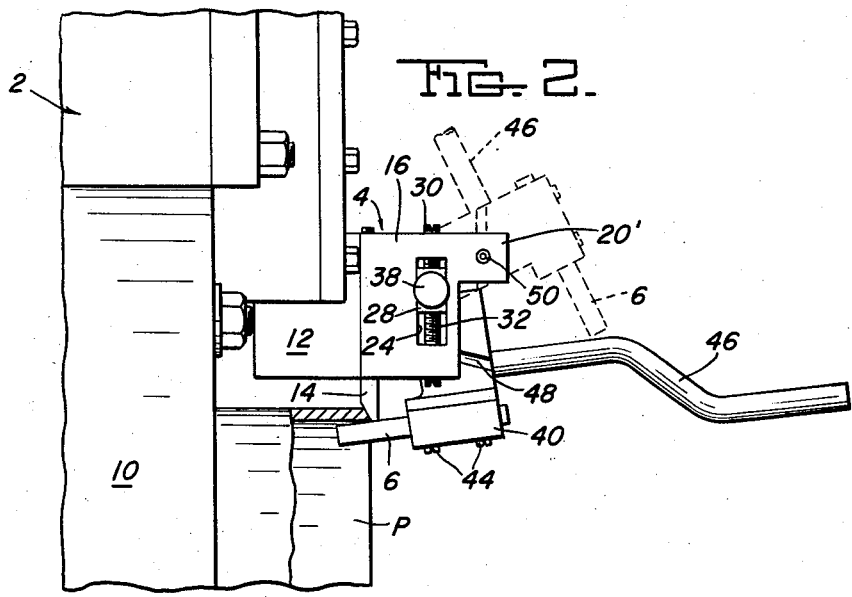
INVENTOR
RALPH G. COLEMAN
By: Donald G. Dalton
Attorney

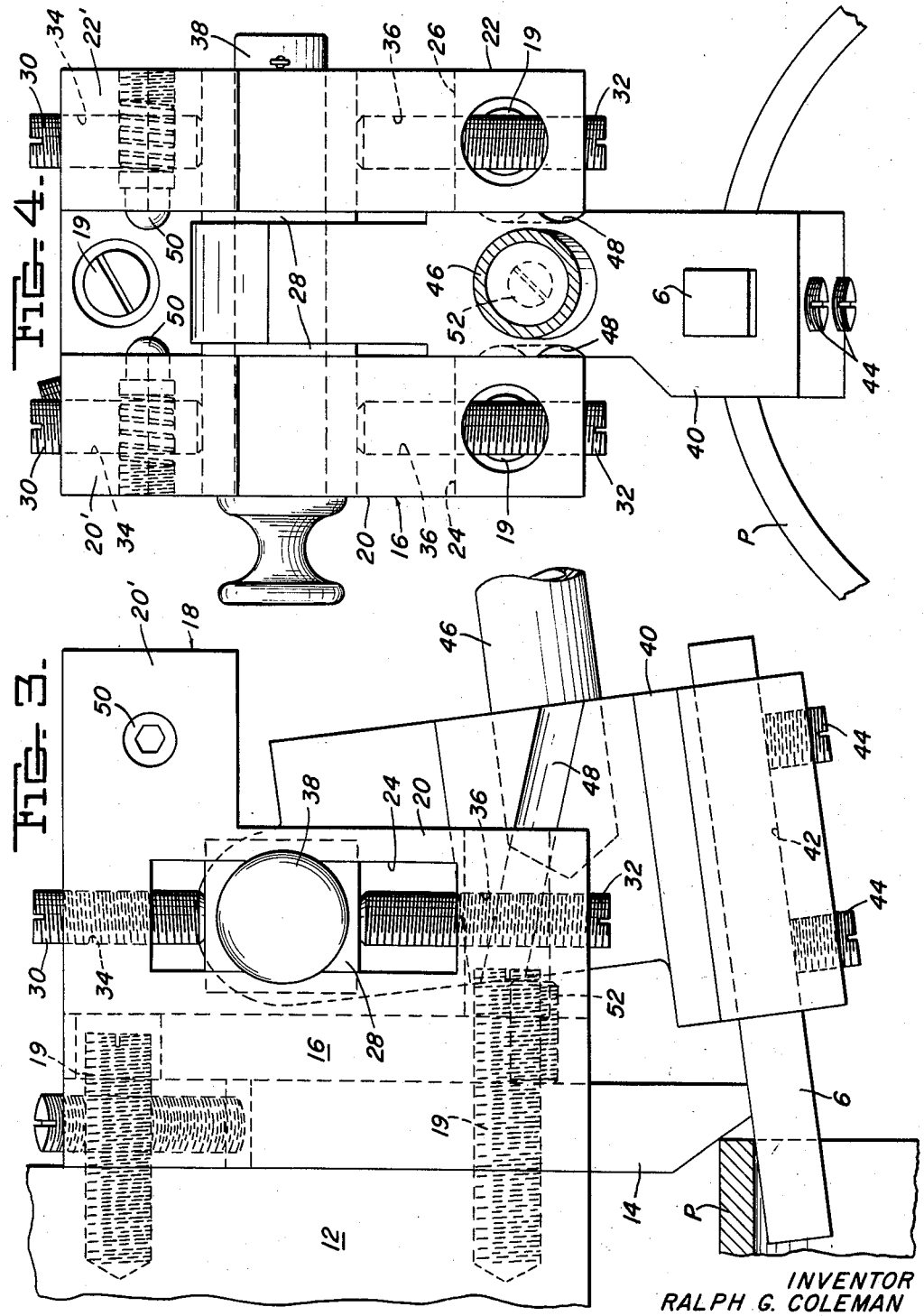

2,889,721

TOOL HOLDER ATTACHMENT FOR PIPE PROCESSING MACHINES

Ralph G. Coleman, Lorain, Ohio, assignor to United States Steel Corporation, a corporation of New Jersey Application June 27, 1957, Serial No. 668,474

1 Claim. (Cl. 77—3)

The present invention relates generally to pipe machining equipment and more particularly to an adjustable tool holder assembly especially suitable for attachment to the fixed tool-supporting head of a pipe-end processing machine.

In the manufacture of certain types of metal pipe after the pipe is cut to the desired length the cut end thereof is chamfered and reamed so as to provide optimum connecting surfaces whereby separate pipe lengths may be easily joined together in the field. The device of the invention is particularly suitable for supporting the reaming tool for such an operation and in this connection the invention will be described.

It is an object of the present invention to provide a tool holder assembly which can be easily and quickly attached to existing pipe processing machinery for adjustably supporting a pipe-end working tool.

It is another object of the invention to provide a tool holder assembly which when attached to the pipe processing machinery may be quickly and easily adjusted relative to the pipe being processed to accommodate a range of pipe sizes.

It is another object of the invention to provide a tool holder assembly which when attached to a pipe processing machine provides means whereby the tool holder can be pivoted so as to move the tool out of the way of the pipe in the machine.

It is still another object of the invention to provide a tool holder assembly for a pipe-end processing machine wherein the tool holder is provided with extended handle means whereby torque may be applied to the holder to force the tool firmly against the pipe end.

It is a further object of the invention to provide a tool holder assembly for a pipe-end processing machine wherein is provided spring-tensioned means for releasably securing the tool holder in a position away from the pipe when desired.

These and other objects will become more apparent after referring to the following specification and attached drawings, in which:

Figure 1 is a front elevational view showing the apparatus of the invention attached to the housing of a pipe cutoff machine;

Figure 2 is a side elevational view of Figure 1 with the chuck assembly shown fragmentary;

Figure 3 is an enlarged side elevational view of the apparatus of the invention; and Figure 4 is an enlarged front elevational view of the apparatus of the invention.

Referring more particularly to the drawings reference numeral 2 designates generally a pipe cut-off machine having the tool holder assembly of the invention, designated generally by reference numeral 4, installed thereon for supporting a pipe reaming tool 6. The pipe reaming tool 6 functions to remove the burr from the inside of a pipe end after the pipe has been cut in the conventional manner.

The cut-off machine 2 includes a frame 8 in which a rotatable pipe-gripping chuck 10 is mounted, a fixed tool-supporting head 12 affixed to the frame 8 adjacent and in front of the chuck 10, and a pipe-end chamfering tool 14 supported on the head 12 for chamfering the end of a pipe P gripped in the chuck. The structural elements of the cut-off machine just described are conventional with the exception of the tool holder assembly of the invention the details of which will now be described.

The tool holder assembly 4 includes a bracket 16 in the form of a block having a bifurcated front end 18 extending in a vertical plane radially of a continuation of the axial center line of the chuck 10, as best shown in Figures 1 and 4. The bracket 16 is affixed to the head 12 by means of bolts 19, as best shown in Figures 1 and 3. The chamfering tool 14 is disposed between the rear of brackets 16 and head 12. The branches 20 and 22 of the bifurcated end 18 are provided with forwardly extending projections 20' and 22' adjacent their upper ends.

Branches 20 and 22 are provided with vertically extending ways or slots 24 and 26, respectively, in each of which is slidably disposed an adjustable bearing 28. Pairs of vertically disposed screws 30, 32 are threadingly mounted in each of the branches 20 and 22 for securing the bearings 28 in adjusted position in the ways 24 and 26. Upper screws 30 in each pair are received in vertically extending drilled and tapped holes 34 in each branch of the bracket 16. Holes 34 extend from the upper surface of the bracket and communicate with the ways 24 and 26. Screws 30 are of sufficient length to normally project upwardly out of holes 34 as well as downwardly into the ways 24 and 26. The upwardly projecting ends of the screws 30 are gripped to turn the screws to raise or lower them in the ways.

Vertically extending drilled and tapped holes 36 are provided in the bottom of the branches 20 and 22 communicating with the ways 24 and 26 for receiving the bottom screws 32. The bottom end of each of the bottom screws is provided with a transverse slot for receiving a screwdriver or the like whereby the screws 32 may be turned and vertically adjusted in the ways 24 and 26. Thus the bearings 28 may be easily and quickly adjusted and secured in vertical position in the ways by adjustment of the screws 30 and 32. A pivot pin 38 is carried by the bearings 28 and spans the space between the branches 20 and 22.

A tool holder 40 is pivoted on the pivot pin 38 between the branches 20 and 22 for pivotal movement toward and away from the end of pipe P projecting from chuck 10. The lower end of the tool holder 40 is provided with a slot 42 in which the reaming tool 6 is slidably and adjustably positioned. The tool 6 may be secured in adjusted position by means of set screws 44.

An elongated handle 46 is affixed to the forward edge of the tool holder 40 in any suitable manner for pivoting the tool holder toward and away from the end of pipe P.

An angularly directed depression 48 is formed on opposite sides of the tool holder intermediate its top and bottom which are engageable by spring-loaded button detents 50 to releasably hold the tool holder 40 away from the work when desired, as shown in dotted lines in Figure 2. The spring-loaded detents project from suitable transverse holes in the portions 20' and 22' of the branches 20 and 22.

An adjustable stop pin 52 carried by the bracket 16 and projecting into the space between the branches 20 and 22 is adapted to be engaged by the tool holder when it is pivoted toward the end of pipe P. Stop pin 52 thus limits the pivotal movement of the tool holder toward the pipe P and thereby functions to control the angle at which reaming tool 6 engages the end of the pipe P.

In operation, the bearings 28 are adjusted in the ways 24 and 26 and secured in adjusted position by means of the pairs of screws 30, 32 to accommodate the wall thickness of the pipe P. This properly adjusts the position of the holder 40 radially of the pipe P so that the tool 6 will engage the inside of the pipe end when the tool holder is pivoted toward the pipe. As explained above, the angle at which the tool 6 engages the pipe end is controlled by stop pin 52. When the reaming tool is in operating engagement with the end of pipe P which is rotated by chuck 10, torque may be applied to the tool 6 to press it against the rotating pipe end by manually exerting pressure on handle 46.

While one embodiment of my invention has been shown and described, it will be apparent that other adaptations and modifications may be made without departing from the scope of the following claim.

I claim:

In a pipe machining apparatus including a rotatable pipe-gripping chuck and a fixed tool-supporting head the combination therewith of a bracket secured to said head, said bracket having a bifurcated end remote from said head which extends in a vertical plane radially of a continuation of the axial center line of the chuck, a vertical way in each branch of the bifurcated end of said bracket, a pair of vertically adjustable bearing blocks slidably disposed one in each of said ways, screw means in said bracket for securing each of said bearings in adjusted position, a pivot pin extending through said pair of bearings and spanning the space between the branches of said bifurcated end, a tool holder pivoted on said pin between the branches of said bifurcated end for pivotal movement toward and away from the end of a pipe gripped in said chuck, a tool carried by the free end of said tool holder adapted to engage said end of said pipe for machining the same, handle means carried by said tool holder for pivoting said holder and for applying a torque to said holder when said tool is in engagement with said end of said pipe, and a spring-tensioned detent in a forward projection of the upper portion of each branch of said bracket cooperable with said tool holder to releasably secure the same in a position away from said end of said pipe.

References Cited in the file of this patent

UNITED STATES PATENTS

| | | |
|---|---|---|
| 1,685,310 | Burrell et al. | Sept. 25, 1928 |
| 1,706,512 | Baines | Mar. 26, 1929 |